US011156301B2

(12) United States Patent
Hayama et al.

(10) Patent No.: US 11,156,301 B2
(45) Date of Patent: Oct. 26, 2021

(54) CAPACITY CONTROL VALVE

(71) Applicant: Eagle Industry Co., Ltd., Tokyo (JP)

(72) Inventors: Masahiro Hayama, Tokyo (JP);
Yoshihiro Ogawa, Tokyo (JP); Keigo Shirafuji, Tokyo (JP); Kohei Fukudome, Tokyo (JP); Takahiro Ejima, Tokyo (JP); Daichi Kurihara, Tokyo (JP); Wataru Takahashi, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 16/962,786

(22) PCT Filed: Jan. 24, 2019

(86) PCT No.: PCT/JP2019/002207
§ 371 (c)(1),
(2) Date: Jul. 16, 2020

(87) PCT Pub. No.: WO2019/146674
PCT Pub. Date: Aug. 1, 2019

(65) Prior Publication Data
US 2020/0355282 A1 Nov. 12, 2020

(30) Foreign Application Priority Data
Jan. 26, 2018 (JP) .............................. JP2018-011642

(51) Int. Cl.
*F16K 15/00* (2006.01)
*F16K 11/10* (2006.01)
(Continued)

(52) U.S. Cl.
CPC ............ *F16K 11/105* (2013.01); *F16K 11/22* (2013.01); *F16K 11/24* (2013.01)

(58) Field of Classification Search
CPC .... F16K 11/105; F16K 31/06; F04B 27/1804; F04B 2027/1831
See application file for complete search history.

(56) References Cited

U.S. PATENT DOCUMENTS

| 6,010,312 A | 1/2000 | Suitou et al. ............... 417/222.2 |
| 6,354,811 B1 | 3/2002 | Ota et al. ................... 417/222.2 |

(Continued)

FOREIGN PATENT DOCUMENTS

| EP | 1091124 | 11/2001 | .............. F04B 27/18 |
| EP | 2 784 320 | 10/2014 | .............. F04B 27/18 |

(Continued)

OTHER PUBLICATIONS

International Search Report and Written Opinion issued in PCT/JP2019/002207, dated Apr. 23, 2019, with English translation, 13 pages.

(Continued)

*Primary Examiner* — Reinaldo Sanchez-Medina
(74) *Attorney, Agent, or Firm* — Hayes Soloway P.C.

(57) ABSTRACT

A capacity control valve V includes a valve housing provided with a Pc port, a Pd port and a Ps port; a main valve body that includes a main valve portion which comes into contact with and separates from a main valve seat 10a to close and open a communication between a Pd port and the Pc port using a driving force of a solenoid; a pressure-sensitive valve capable of opening and closing, depending on a surrounding pressure, a first communication passage through which the Pc port and the Ps port are communicable with each other; and a differential pressure valve capable of opening and closing, depending on a pressure difference, a second communication passage through which the Pc port and the Ps port are communicable with each other.

6 Claims, 7 Drawing Sheets

(51) Int. Cl.
*F16K 11/22* (2006.01)
*F16K 11/24* (2006.01)

(56) References Cited

U.S. PATENT DOCUMENTS

| | | | |
|---|---|---|---|
| 6,358,017 B1 | 3/2002 | Ota et al. | 417/222.2 |
| 6,361,283 B1 | 3/2002 | Ota et al. | 417/222.2 |
| 6,485,267 B1 | 11/2002 | Imai et al. | 417/222.2 |
| 7,644,729 B2 * | 1/2010 | Cho | F04B 27/1804 137/625.27 |
| 8,021,124 B2 | 9/2011 | Unemura et al. | 417/222.2 |
| 9,181,937 B2 * | 11/2015 | Ota | F04B 27/1804 |
| 2004/0060604 A1 | 4/2004 | Uemura et al. | 137/595 |
| 2006/0218953 A1 | 10/2006 | Hirota | 62/228.5 |
| 2009/0183786 A1 | 7/2009 | Iwa et al. | 137/487.5 |
| 2012/0198992 A1 | 8/2012 | Futakuchi et al. | 91/505 |
| 2013/0291963 A1 | 11/2013 | Futakuchi et al. | B60H 1/00485 |
| 2015/0211506 A1 | 7/2015 | Shirafuji et al. | F04B 27/1804 |
| 2015/0345655 A1 | 12/2015 | Higashidozono et al. | F16K 31/06 |

FOREIGN PATENT DOCUMENTS

| | | | | |
|---|---|---|---|---|
| EP | 3 431 760 | 1/2019 | | F04B 27/18 |
| EP | 3744978 | 2/2020 | | F04B 27/18 |
| JP | 5-306679 | 11/1993 | | F04B 27/08 |
| JP | 6-200875 | 7/1994 | | F04B 27/08 |
| JP | 2000-345961 | 12/2000 | | F04B 27/14 |
| JP | 2001-73939 | 3/2001 | | F04B 27/14 |
| JP | 2001-132632 | 5/2001 | | F04B 27/14 |
| JP | 2006-52648 | 2/2006 | | F04B 27/14 |
| JP | 2006-307828 | 11/2006 | | F04B 27/14 |
| JP | 4242624 | 1/2009 | | F04B 49/00 |
| JP | 4700048 | 3/2011 | | F04B 49/00 |
| JP | 5167121 | 12/2012 | | F04B 27/14 |
| JP | 5557901 | 6/2014 | | F04B 27/14 |
| JP | 2014-190247 | 10/2014 | | F04B 27/14 |
| JP | 2017-129042 | 7/2017 | | F04B 27/18 |
| JP | 6206274 | 10/2017 | | F04B 27/18 |
| JP | 2018-40385 | 3/2018 | | F16K 31/06 |
| WO | WO2005095796 | 10/2005 | | F04B 27/14 |
| WO | WO 2007/119380 | 10/2007 | | F04B 27/14 |
| WO | WO 2014/091975 | 6/2014 | | F04B 27/14 |
| WO | WO 2014/119594 | 8/2014 | | F04B 27/14 |
| WO | WO 2017/057160 | 4/2017 | | F04B 27/18 |
| WO | WO 2017/159553 | 9/2017 | | F04B 27/18 |

OTHER PUBLICATIONS

International Preliminary Report on Patentability issued in PCT/JP2019/002207, dated Aug. 6, 2020, 7 pages.
U.S. Appl. No. 17/258,708, filed Jan. 7, 2021, Hayama et al.
U.S. Appl. No. 17/258,692, filed Jan. 7, 2021, Hayama et al.
U.S. Appl. No. 17/256,947, filed Dec. 29, 2020, Hayama et al.
U.S. Appl. No. 17/256,955, filed Dec. 29, 2020, Hayama et al.
U.S. Appl. No. 17/256,959, filed Dec. 29, 2020, Hayama et al.
U.S. Appl. No. 17/256,953, filed Dec. 29, 2020, Hayama et al.
U.S. Appl. No. 17/056,988, filed Nov. 19, 2020, Kurihara et al.
U.S. Appl. No. 16/969,175, filed Aug. 11, 2020, Kurihara et al.
U.S. Appl. No. 16/967,693, filed Aug. 5, 2020, Hayama et al.
U.S. Appl. No. 16/967,692, filed Aug. 5, 2020, Hayama et al.

International Search Report and Written Opinion issued in PCT/JP2019/005200, dated Apr. 23, 2019, with English translation, 12 pages.
International Preliminary Report on Patentability issued in PCT/JP2019/005200, dated Aug. 18, 2020, 7 pages.
International Search Report and Written Opinion issued in PCT/JP2019/007187, dated Apr. 23, 2019, with English translation, 16 pages.
International Preliminary Report on Patentability issued in PCT/JP2019/007187, dated Sep. 3, 2020, 8 pages.
International Search Report and Written Opinion issued in PCT/JP2019/020196, dated Aug. 27, 2019, with English translation, 11 pages.
International Preliminary Report on Patentability issued in PCT/JP2019/020196, dated Nov. 24, 2020, with English translation, 6 pages.
International Search Report and Written Opinion issued in PCT/JP2019/005199, dated Apr. 23, 2019, with English translation, 12 pages.
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.
International Preliminary Report on Patentability issued in PCT/JP2019/031067, dated Feb. 9, 2021, 6 pages.
International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.
International Search Report and Written Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
U.S. Appl. No. 17/259,138, filed Jan. 8, 2021, Hayama et al.
European Search Report issued in corresponding European Patent Application Serial No. 19754335.8, dated Jun. 21, 2021, 11 pages.
European Search Report issued in corresponding European Patent Application Serial No. 19754335.8, dated Jun. 12, 2021, 12 pages.

* cited by examiner

CAPACITY CONTROL VALVE

TECHNICAL FIELD

The present invention relates to a capacity control valve that variably controls the capacity or pressure of a working fluid, for example, to a capacity control valve that controls the discharge amount of a variable displacement compressor used in an air conditioning system of a vehicle, according to the pressure of a working fluid.

BACKGROUND ART

A variable displacement compressor used in an air conditioning system of a vehicle or the like includes a rotary shaft which is driven and rotated by an engine; a swash plate which is coupled to the rotary shaft such that the inclined angle of the swash plate is variable; a piston for compression coupled to the swash plate; and the like. The variable displacement compressor changes the stroke amount of the piston by changing the inclined angle of the swash plate and thus to control the discharge amount of a fluid. The inclined angle of the swash plate can be continuously changed by appropriately controlling the pressure in a control chamber using a capacity control valve that is opened and closed by an electromagnetic force while using a suction pressure Ps of a suction chamber that suctions the fluid, a discharge pressure Pd of a discharge chamber that discharges the fluid pressurized by the piston, and a control pressure Pc of the control chamber that accommodates the swash plate.

During the normal driving of the variable displacement compressor (hereinafter, may be simply referred to as "during the normal driving"), the capacity control valve performs normal control where a solenoid is energized and controlled by a control computer, and a main valve body is moved in the axial direction by an electromagnetic force generated by the solenoid to open and close a main valve; and thereby, the control pressure Pc of the control chamber is adjusted.

In the normal control of the capacity control valve, since the pressure in the control chamber in the variable displacement compressor is appropriately controlled and the inclined angle of the swash plate with respect to the rotary shaft is continuously changed, the stroke amount of the piston is changed; and thereby, the discharge amount of the fluid for the discharge chamber is controlled, and thus the cooling capacity of the air conditioning system is adjusted to a desired cooling capacity.

In the foregoing variable displacement compressor, when the variable displacement compressor stops and then is left in a stop state for a long time, the suction pressure Ps, the discharge pressure Pd, and the control pressure Pc of the variable displacement compressor become equalized, and the control pressure Pc and the suction pressure Ps become much higher than the control pressure Pc and the suction pressure Ps during the normal driving, and thus liquefaction may occur in a part of the fluid in the control chamber. When the variable displacement compressor starts up from this state, since the control pressure Pc is much higher than that during the normal driving, and it is difficult for the control chamber to reach the maximum displacement due to the liquefied fluid, it takes a long time for the discharge amount to be controlled to a target value. For this reason, the capacity control valve is employed to exhaust the liquefied fluid from inside the control chamber of the variable displacement compressor within a short time when the variable displacement compressor starts up.

Figure 7:
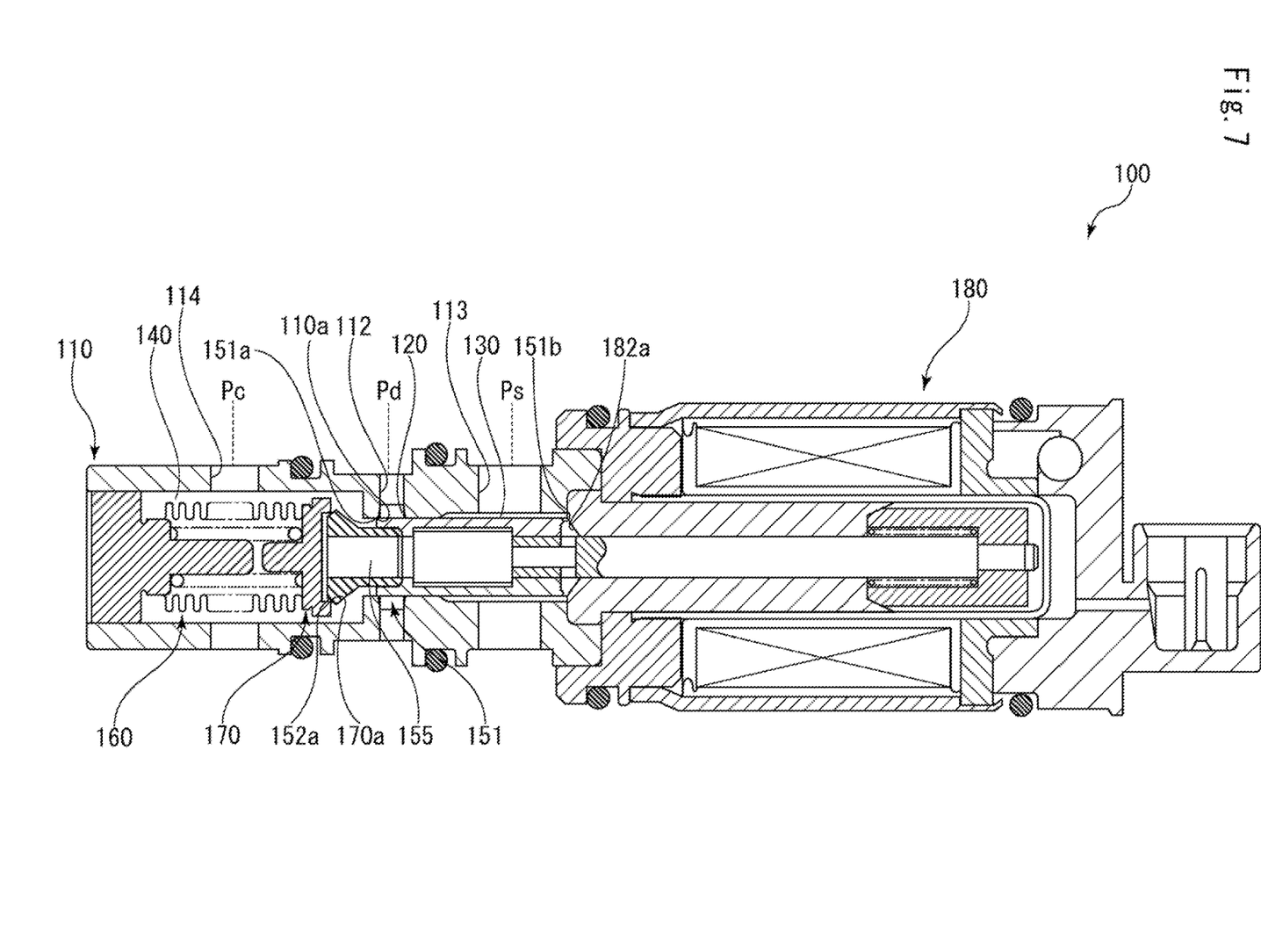
FIG. 7 is a cross-sectional view illustrating a mode where a first valve is closed when a capacity control valve of Patent Citation 1 in the related art is in an energizing state.

As illustrated in FIG. 7, a capacity control valve 100 disclosed in Patent Citation 1 includes a valve housing 110 including a first communication passage 112 (i.e., so-called Pd port) through which a first valve chamber 120 in which a first valve seat 110a is formed communicates with the discharge chamber of the variable displacement compressor, a second communication passage 113 (i.e., so-called Ps port) through which a second valve chamber 130 in which a second valve seat 182a is formed communicates with the suction chamber of the variable displacement compressor, and a third communication passage 114 (i.e., so-called Pc port) through which a third valve chamber 140 which is formed opposite to the second valve chamber 130 with respect to the first valve chamber 120 in the axial direction communicates with the control chamber of the variable displacement compressor; a main valve body 151 that integrally includes a first valve portion 151a which comes into contact with and separates from the first valve seat 110a in the first valve chamber 120 to open and close a communication between the discharge chamber and the control chamber, and a second valve portion 151b which comes into contact with and separates from the second valve seat 182a in the second valve chamber 130 to open and close a communication between the control chamber and the suction chamber, and that reciprocates to perform opening and closing operations in opposite directions; an intermediate communication passage 155 through which the second valve chamber 130 communicates with the third valve chamber 140; a pressure-sensitive body 160 that is disposed in the third valve chamber 140 to apply a biasing force to the main valve body 151 in a valve opening direction of a main valve according to a surrounding fluid pressure; an adapter 170 including an annular pressure-sensitive valve seat 170a at a free end of the pressure-sensitive body 160 in an extension and contraction direction of the pressure-sensitive body 160, the annular pressure-sensitive valve seat 170a coming into contact with and separating from a pressure-sensitive valve portion 152a integrally provided in the main valve body 151, to open and close a communication between the third valve chamber 140 and the intermediate communication passage 155; and a solenoid 180 that exerts a driving force on the main valve body 151.

At the startup of the variable displacement compressor, when the solenoid 180 of the capacity control valve 100 is energized and the main valve body 151 moves in the axial direction, the first valve portion 151a closes the main valve, and at the same time, the second valve portion 151b opens a second valve. Furthermore, since the pressure-sensitive body 160 contracts due to the suction pressure Ps which is much higher than that during the normal driving, by opening a pressure-sensitive valve, a flow path through which the third valve chamber 140 communicates with the second valve chamber 130 is formed inside the valve housing 110 by the intermediate communication passage 155. In addition, since the suction pressure Ps of the suction chamber is lowered upon the startup of the variable displacement compressor, a liquefied fluid in a high pressure state in the control chamber moves due to a pressure difference between the suction chamber and the control chamber, and is exhausted through the flow path formed inside the valve housing 110 within a short time.

CITATION LIST

Patent Literature

Patent Citation 1: JP 4700048 B2 (Page 8, FIG. 2)

SUMMARY OF INVENTION

Technical Problem

However, in Patent Citation 1, when the variable displacement compressor starts up, since the flow path cross-sectional area of the flow path which exhausts the liquefied refrigerant in the control chamber is only the opening area of the pressure-sensitive valve, the liquefied fluid is not rapidly exhausted from the control chamber, and it takes a time for the control chamber to reach the maximum displacement. In addition, after the variable displacement compressor starts up, when all the liquefied fluid is exhausted and the control chamber reaches the maximum displacement, the capacity control valve 100 maintains the control pressure Pc and the suction pressure Ps at the same pressure so as to maintain the maximum displacement state. However, when the suction pressure Ps is low, since the pressure-sensitive body 160 does not contract and the pressure-sensitive valve cannot be opened, the control pressure Pc and the suction pressure Ps cannot be maintained at the same pressure and a differential pressure occurs between the control pressure Pc and the suction pressure Ps, and thus wobbles occur in the stroke of the piston; and thereby, the maximum displacement state of the control chamber cannot be maintained, and thus the operational efficiency decreases, which is a problem.

The present invention has been made in light of the foregoing problems, and an object of the present invention is to provide a capacity control valve having a good startup responsiveness and a good operational efficiency.

Solution to Problem

In order to solve the foregoing problems, a capacity control valve according to the present invention includes: a valve housing provided with a Pc port, a Pd port and a Ps port; a main valve body that includes a main valve portion which comes into contact with and separates from a main valve seat to close and open a communication between a Pd port and the Pc port using a driving force of a solenoid; a pressure-sensitive valve that is capable of opening and closing, depending on a surrounding pressure, a first communication passage through which the Pc port and the Ps port are communicable with each other; and a differential pressure valve that is capable of opening and closing, depending on a pressure difference, a second communication passage through which the Pc port and the Ps port are communicable with each other. According to the above-mentioned characteristic, when the variable displacement compressor starts up, the pressure-sensitive valve is opened, and thus the first communication passage as an intermediate communication passage through which the Pc port and the Ps port communicate with each other is opened is opened, and the differential pressure valve is opened, and thus the second communication passage as a differential pressure communication passage through which the Pc port and the Ps port communicate with each other is opened; and thereby, it is possible to improve the startup responsiveness by exhausting a liquefied fluid from inside the control chamber into the suction chamber through the pressure-sensitive valve and the differential pressure valve within a short time. After the variable displacement compressor starts up, even when the pressure-sensitive valve is closed due to the lowering of the suction pressure in the Ps port, the differential pressure valve is opened due to pressure difference between the control pressure in the Pc port and the suction pressure in the Ps port, and thus the second communication passage as the differential pressure communication passage through which the Pc port and the Ps port communicate with each other is opened, and therefore, the control pressure in the Pc port and the suction pressure in the Ps port can be maintained at the same pressure; and thereby, it is possible to improve the operational efficiency by maintaining a maximum capacity state.

It is preferable that a maximum opening area of the differential pressure valve is smaller than a flow path cross-sectional area of the Pc port. According to this configuration, since the maximum opening area of the differential pressure valve is sufficiently smaller than the flow path cross-sectional area of the Pc port, pressure difference occurs due to the flow of the fluid from the Pc port toward the Ps port, and it is possible to reliably operate the differential pressure valve in a valve closing direction by using the pressure difference.

It is preferable that the differential pressure valve includes a differential pressure valve body having a cylindrical shape and a spring which biases the differential pressure valve body in a valve opening direction, and is concentrically provided outside the pressure-sensitive valve in a radial direction. According to this configuration, the capacity control valve including the differential pressure valve can be made compact.

It is preferable that the differential pressure valve body includes a differential pressure valve portion that is capable of seating on a differential pressure valve seat, and when the differential pressure valve body is biased and moved in the valve opening direction of the differential pressure valve, an end portion of the differential pressure valve body which is remote from the differential pressure valve portion in an axial direction comes into contact with an inner surface of the valve housing. According to this configuration, since the maximum opening area of the differential pressure valve can be set by contact between the differential pressure valve body and the inner surface of the valve housing, it is possible to simplify the structure of the differential pressure valve.

It is preferable that the Ps port comprises a first Ps port communicating with the first communication passage and a second Ps port communicating with the second communication passage. According to this configuration, since the first Ps port for the first communication passage opened and closed by the pressure sensitive valve and the second Ps port for the second communication passage opened and closed by the differential pressure valve are provided separately from each other, it is possible to simplify the structure of the valve housing.

DESCRIPTION OF EMBODIMENTS

Modes for implementing a capacity control valve according to the present invention will be described below based on examples.

First Embodiment

A capacity control valve according to a first embodiment of the present invention will be described with reference to FIGS. 1 to 5. Hereinafter, a description will be given based on the assumption that right and left sides on FIG. 2 as viewed from a front side are right and left sides of the capacity control valve.

A capacity control valve V of the present invention is assembled into a variable displacement compressor M which is used in an air conditioning system of a vehicle or the like, and variably controls the pressure of a working fluid (hereinafter, simply referred to as a "fluid") which is a refrigerant, to control the discharge amount of the variable displacement compressor M, and adjust the cooling capacity of the air conditioning system to a desired cooling capacity.

Figure 1:
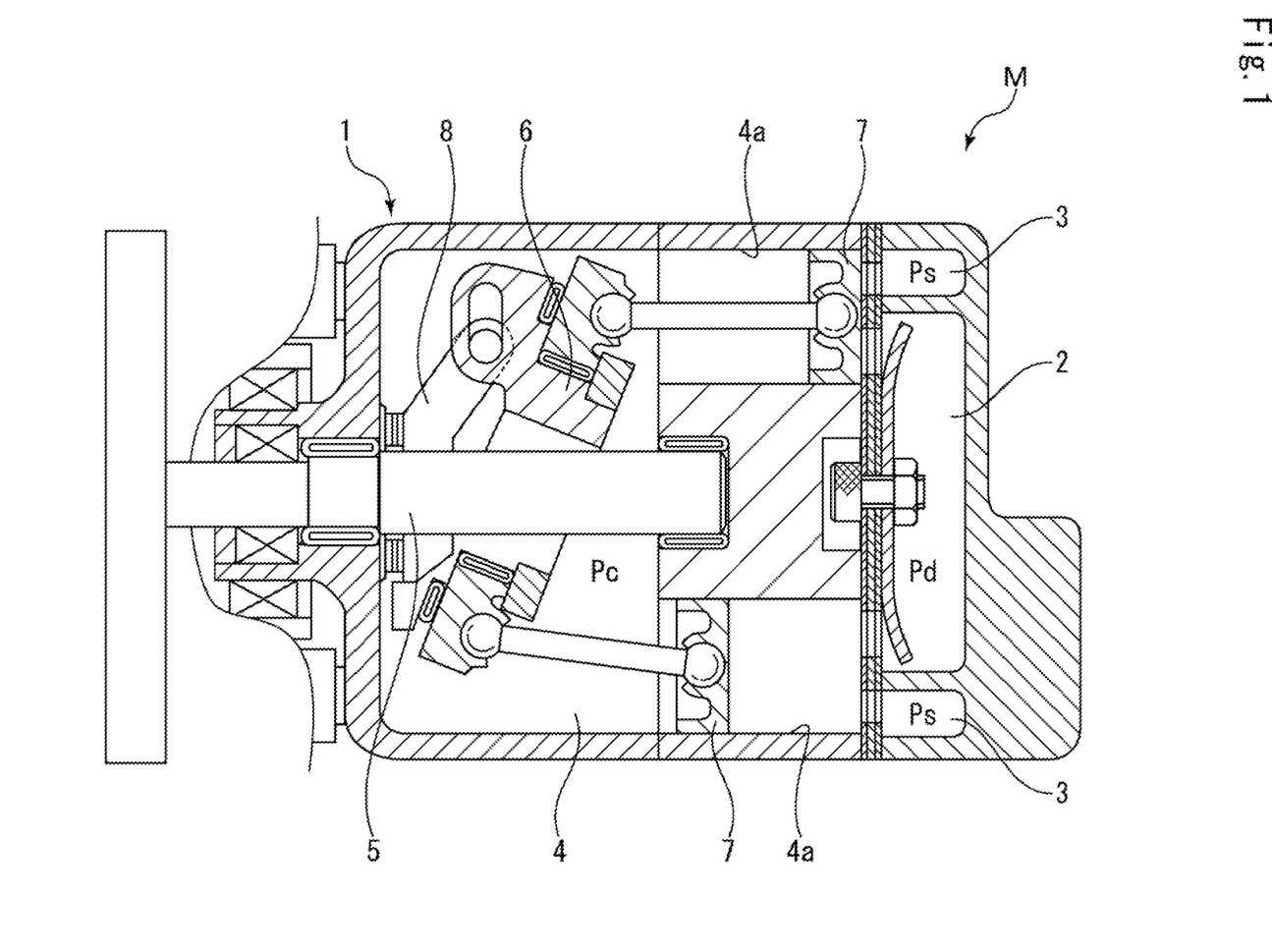
FIG. 1 is a schematic configuration view illustrating a swash plate-type variable displacement compressor into which a capacity control valve according to a first embodiment of the present invention is assembled.

Firstly, the variable displacement compressor M will be described. As illustrated in FIG. 1, the variable displacement compressor M includes a casing 1 including a discharge chamber 2, a suction chamber 3, a control chamber 4, and a plurality of cylinders 4a. Incidentally, the variable displacement compressor M is provided with a communication passage (not illustrated) through which the control chamber 4 and the suction chamber 3 directly communicate with each other. The communication passage is provided with a fixed orifice for adjusting and balancing the pressures of the suction chamber 3 and the control chamber 4.

In addition, the variable displacement compressor M includes a rotary shaft 5 that is driven and rotated by an engine (not illustrated) installed outside the casing 1; a swash plate 6 that is eccentrically coupled to the rotary shaft 5 by a hinge mechanism 8 in the control chamber 4; and a plurality of pistons 7 that are coupled to the swash plate 6 and are reciprocatably fitted in the cylinders 4a. The inclined angle of the swash plate 6 is continuously changed by appropriately controlling the pressure in the control chamber 4 while using the capacity control valve V that is opened and closed by an electromagnetic force, and using a suction pressure Ps of the suction chamber 3 that suctions the fluid, a discharge pressure Pd of the discharge chamber 2 that discharges the fluid pressurized by the pistons 7, and a control pressure Pc of the control chamber 4 that accommodates the swash plate 6; and thereby, the stroke amounts of the pistons 7 are changed, and thus the discharge amount of the fluid is controlled. Incidentally, for convenience of description, in FIG. 1, the illustration of the capacity control valve V assembled into the variable displacement compressor M is omitted.

Specifically, as the control pressure Pc in the control chamber 4 becomes higher, the inclined angle of the swash plate 6 with respect to the rotary shaft 5 becomes smaller, so that the stroke amounts of the pistons 7 are reduced. When the control pressure Pc reaches a certain pressure or higher, the swash plate 6 enters the state (including a state of being slightly inclined from perpendicularity) of being substantially perpendicular to the rotary shaft 5. In this case, since the stroke amounts of the pistons 7 are minimized and the pressurization of the fluid in the cylinders 4a by the pistons 7 is minimized, the discharge amount of the fluid toward the discharge chamber 2 is reduced, and the cooling capacity of the air conditioning system is minimized. On the other hand, as the control pressure Pc in the control chamber 4 becomes lower, the inclined angle of the swash plate 6 with respect to the rotary shaft 5 becomes larger, so that the stroke amounts of the pistons 7 increase. When the control pressure Pc reaches a certain pressure or lower, the inclined angle of the swash plate 6 with respect to the rotary shaft 5 becomes the maximum inclined angle. In this case, since the stroke amounts of the pistons 7 are maximized and the pressurization of the fluid in the cylinders 4a by the pistons 7 is maximized, the discharge amount of the fluid toward the discharge chamber 2 is increased, and the cooling capacity of the air conditioning system is maximized.

Figure 2:
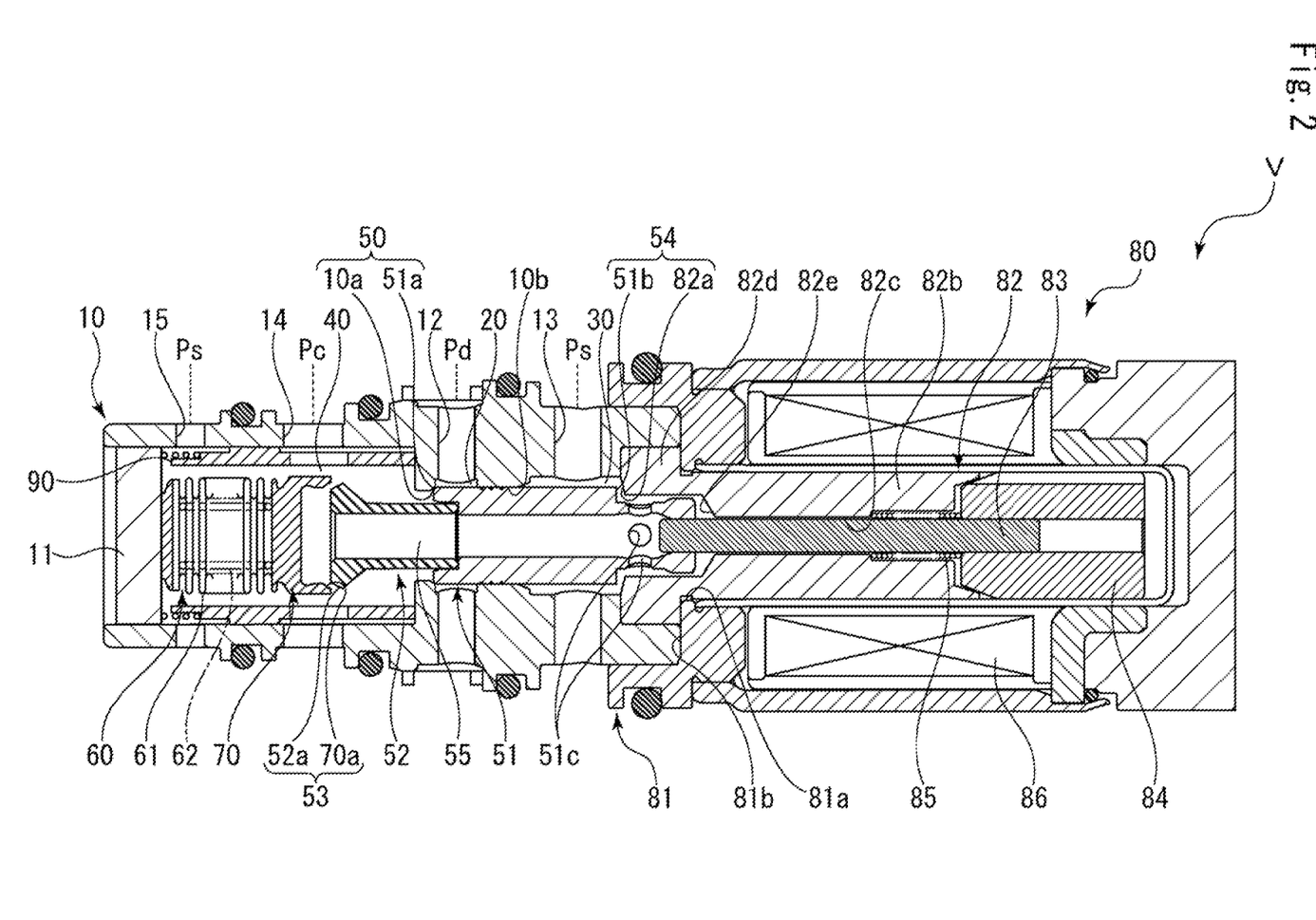
FIG. 2 is a cross-sectional view illustrating a mode where a first valve is closed and a pressure-sensitive valve and a differential pressure valve are opened when the capacity control valve of the first example is at start up in an energizing state.

As illustrated in FIG. 2, the capacity control valve V assembled into the variable displacement compressor M controls the opening and closing of a first valve 50 and a second valve 54 which are main valves in the capacity control valve V by adjusting a current with which a coil 86 forming a solenoid 80 is energized, and controls the fluid flowing into the control chamber 4 or flowing out from the control chamber 4 by controlling the opening and closing of a pressure-sensitive valve 53 using a surrounding fluid pressure; and thereby, the capacity control valve V variably controls the control pressure Pc in the control chamber 4.

In the first embodiment, the first valve 50 includes a main valve body 51 and a first valve seat 10a which is a main valve seat formed in an inner peripheral surface of a valve housing 10. A first valve portion 51a which is a main valve portion formed at a left axial end of the main valve body 51 comes into contact with and separates from the first valve seat 10a. The second valve 54 includes the main valve body 51 and a second valve seat 82a that is formed in a left axial end surface which is an opening end surface of a fixed core 82. A second valve portion 51b which is formed at a right axial end of the main valve body 51 comes into contact with and separates from the second valve seat 82a. The pressure-sensitive valve 53 includes an adapter 70 of a pressure-sensitive body 60 and a pressure-sensitive valve seat 52a that is formed in a left axial end portion of a pressure-sensitive valve member 52. A right axial end 70a of the adapter 70 comes into contact with and separates from the pressure-sensitive valve seat 52a.

Subsequently, the structure of the capacity control valve V will be described. As illustrated in FIG. 2, the capacity control valve V mainly includes the valve housing 10 made of a metallic material or a resin material; the main valve body 51 and the pressure-sensitive valve member 52 that are inserted into the valve housing 10 to be able to reciprocate in an axial direction; the pressure-sensitive body 60 that applies a biasing force to the main valve body 51 and the pressure-sensitive valve member 52 toward right in the axial direction according to the surrounding fluid pressure; the solenoid 80 that exerts a driving force on the main valve body 51 and the pressure-sensitive valve member 52 connected to the valve housing 10; and a differential pressure valve 90 that is concentrically provided outside the pressure-sensitive body 60 in a radial direction. In this example, the differential pressure valve 90 includes a differential pressure valve portion 91a that is formed at a left axial end of a differential pressure valve body 91, and a differential pressure valve seat 11a that is formed in a right axial end surface of an adjusting partition member 11 (refer to FIGS. 3 and 4).

As illustrated in FIG. 2, the solenoid 80 mainly includes a casing 81 including an opening portion 81a that is open toward left in the axial direction; a fixed core 82 having a substantially cylindrical shape which is inserted through the opening portion 81a of the casing 81 from left in the axial direction and is fixed to an inner diameter side of the casing 81; a drive rod 83 which is able to reciprocate in the axial direction on an inner diameter side of the fixed core 82 and of which the left axial end portion is connected and fixed to the main valve body 51; a movable core 84 that is fastened to a right axial end portion of the drive rod 83; a coil spring 85 that is provided between the fixed core 82 and the movable core 84 to bias the movable core 84 toward right in the axial direction; and the coil 86 for excitation that is wound on an outer side of the fixed core 82 with a bobbin interposed therebetween.

A recess portion 81b which is recessed from a radial center of a left axial end of the casing 81 toward right in the axial direction is formed in the casing 81. A right axial end portion of the valve housing 10 is inserted into and fixed to the recess portion 81b.

The fixed core 82 is formed from a rigid body that is made of a magnetic material such as iron or silicon steel, and includes a cylindrical portion 82b where an insertion hole 82c into which the drive rod 83 extending in the axial direction is inserted is formed, and a flange portion 82d having an annular shape which extends from an outer peripheral surface of a left axial end portion of the cylindrical portion 82b toward outside in the radial direction. A recess portion 82e which is recessed from a radial center of a left axial end of the cylindrical portion 82b toward right in the axial direction is formed in the fixed core 82.

As illustrated in FIG. 2, the adjusting partition member 11 is press-fitted in a left axial end portion of the valve housing 10, so that the valve housing 10 has a substantially cylindrical shape with a bottom. The main valve body 51 and the pressure-sensitive valve member 52 are disposed inside the valve housing 10 to be able to reciprocate in the axial direction. A guide surface 10b having a small diameter with which an outer peripheral surface of the main valve body 51 is in slidable contact is formed in a part of the inner peripheral surface of the valve housing 10. Incidentally, the adjusting partition member 11 can adjust the biasing force of the pressure-sensitive body 60 and the biasing force of a coil spring 92 (refer to FIGS. 3 and 4) which is a spring of the differential pressure valve 90 by adjusting the installation position of the valve housing 10 in the axial direction.

In addition, a first valve chambers 20 in which a first valve portion 51a side of the main valve body 51 is disposed, a second valve chamber 30 which is formed on a right axial side which is a back pressure side of the main valve body 51, and a pressure-sensitive chamber 40 which is formed at a position that is opposite to the second valve chamber 30 with respect to the first valve chamber 20 are formed inside the valve housing 10. Incidentally, the second valve chamber 30 is defined by the outer peripheral surface on the back pressure side of the main valve body 51, the left axial end surface which is the opening end surface of the fixed core 82 and the recess portion 82e, and the inner peripheral surface of the valve housing 10 which is positioned closer to the right side in the axial direction than the guide surface 10b.

In addition, a Pd port 12 through which the first valve chamber 20 communicates with the discharge chamber 2 of the variable displacement compressor M, a first Ps port 13 that is a Ps port through which the second valve chamber 30 communicates with the suction chamber 3 of the variable displacement compressor M, a Pc port 14 through which the pressure-sensitive chamber 40 communicates with the control chamber 4 of the variable displacement compressor M, and a second Ps port 15 that is adjacent to a left axial side of the Pc port 14 and through which the pressure-sensitive chamber 40 communicates with the suction chamber 3 of the variable displacement compressor M are formed in the valve housing 10.

As illustrated in FIG. 2, the main valve body 51 has a substantially cylindrical shape. The pressure-sensitive valve member 52 having a substantially cylindrical shape and a substantially turret shape in a side view is connected and fixed to a left axial end portion of the main valve body 51, and the drive rod 83 is connected and fixed to a right axial end portion thereof. The main valve body 51, the pressure-sensitive valve member 52, and the drive rod 83 move integrally in the axial direction. In addition, a hollow hole connects the insides of the main valve body 51 and the pressure-sensitive valve member 52 to form an intermediate communication passage 55 that penetrates therethrough over the axial direction. Incidentally, the intermediate communication passage 55 communicates with the second valve chamber 30 via a plurality of through-holes 51c that penetrate through the right axial end portion of the main valve body 51 in the radial direction.

As illustrated in FIG. 2, the pressure-sensitive body 60 mainly includes a bellows core 61 in which a coil spring 62 is built, and the adapter 70 which is formed in a right axial end portion of the bellows core 61. A left axial end of the bellows core 61 is fixed to the adjusting partition member 11.

In addition, the pressure-sensitive body 60 is disposed in the pressure-sensitive chamber 40. The right axial end 70a of the adapter 70 is seated on the pressure-sensitive valve seat 52a of the pressure-sensitive valve member 52 by the biasing forces of the coil spring 62 and the bellows core 61. Incidentally, when the suction pressure Ps in the intermediate communication passage 55 is high, the pressure-sensitive body 60 contracts due to the surrounding fluid pressure which is the suction pressure Ps, and operates to cause the right axial end 70a of the adapter 70 to separate from the pressure-sensitive valve seat 52a of the pressure-sensitive valve member 52, so that the pressure-sensitive valve 53 is opened (refer to FIGS. 2 and 3). Accordingly, for example, when the suction pressure Ps in the second valve chamber 30 is high, the control pressure Pc can be rapidly released toward the second valve chamber 30 through the intermediate communication passage 55 and the through-holes 51c of the main valve body 51.

Figure 3:
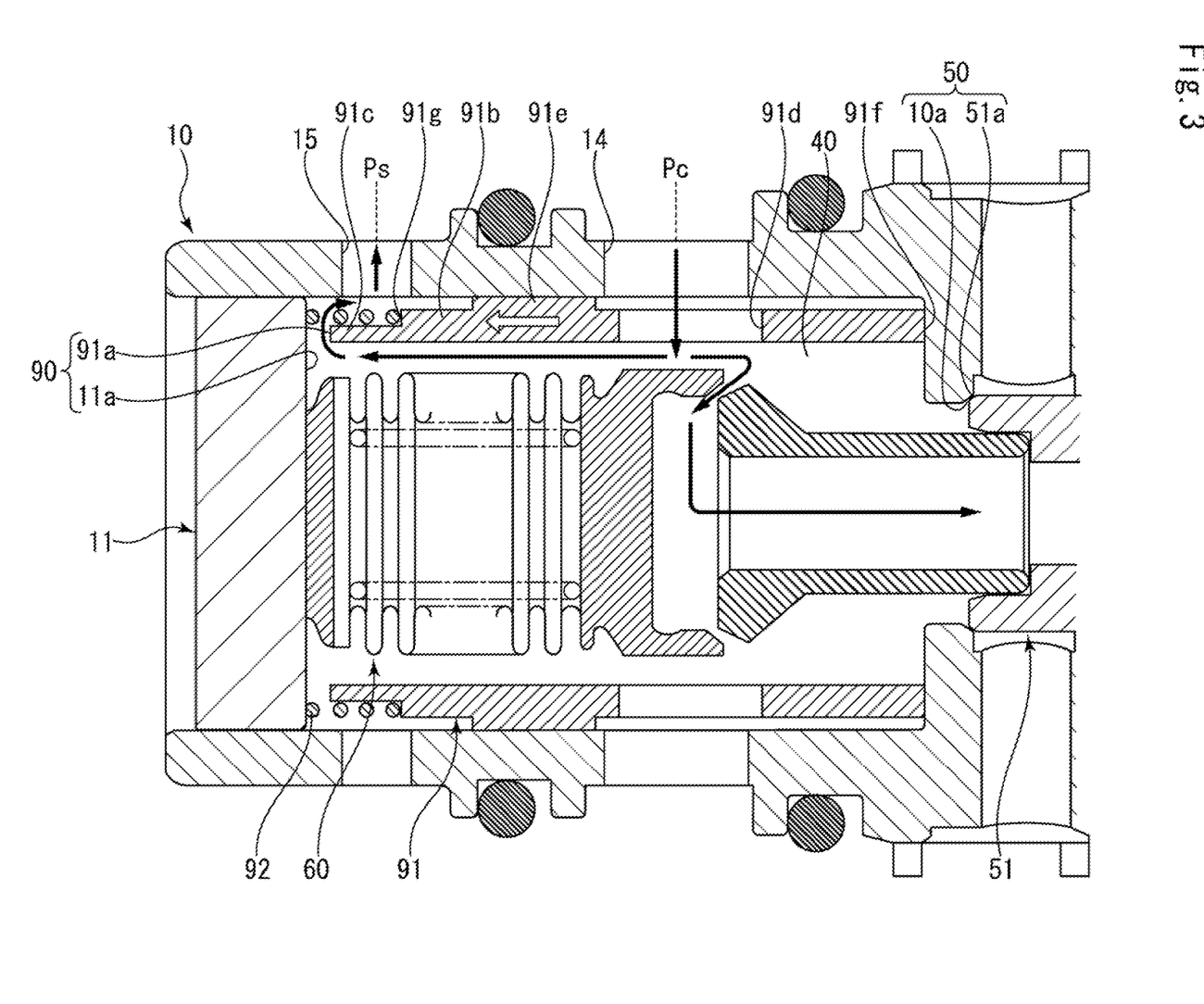
FIG. 3 is an enlarged cross-sectional view of FIG. 2 illustrating a mode where the pressure-sensitive valve and the differential pressure valve are opened when the capacity control valve of the first example is at the startup in the energizing state.
Figure 4:
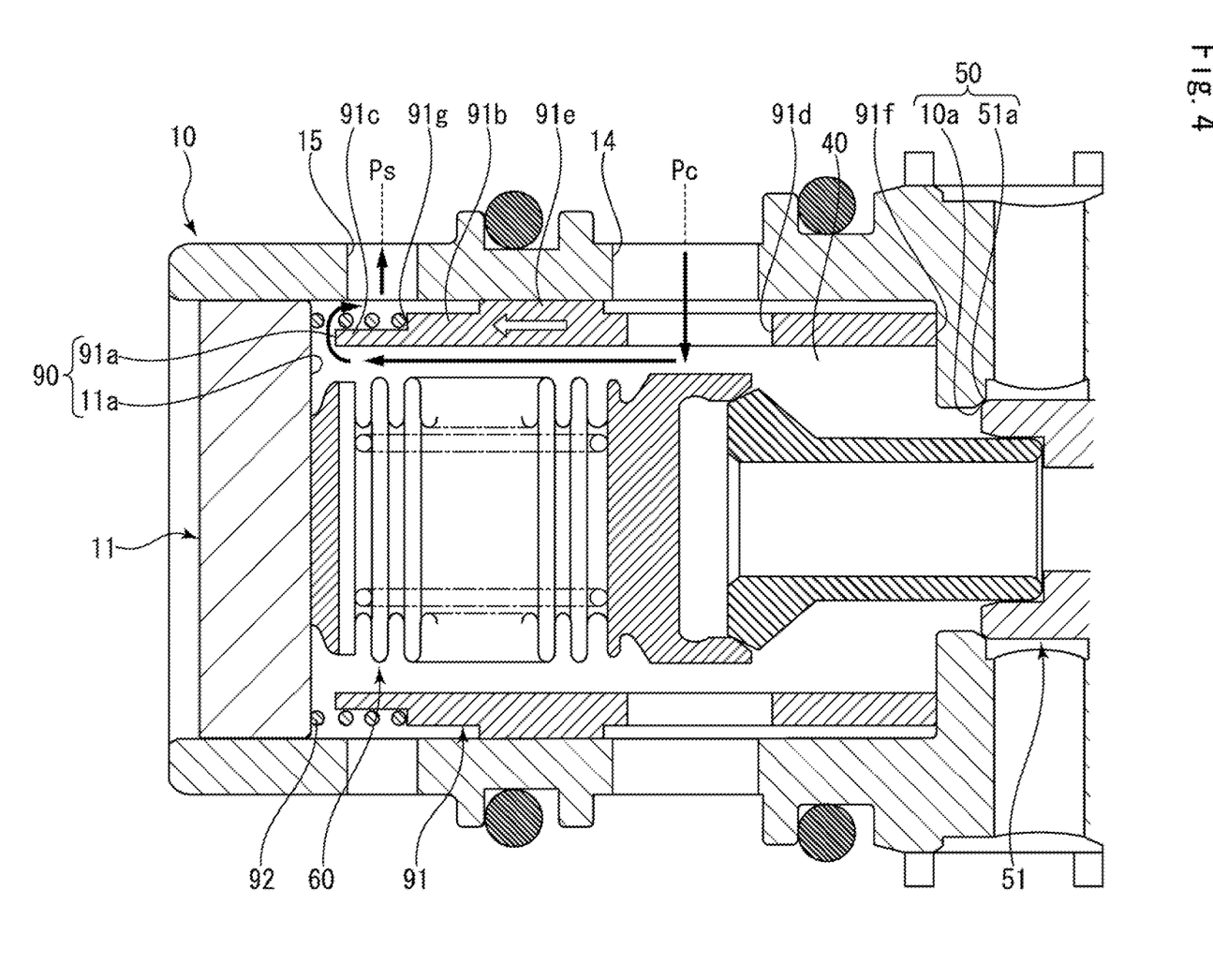
FIG. 4 is an enlarged cross-sectional view illustrating a mode where the pressure-sensitive valve is closed and the differential pressure valve is opened when the capacity control valve of the first embodiment is in the energizing state after startup.
Figure 5:
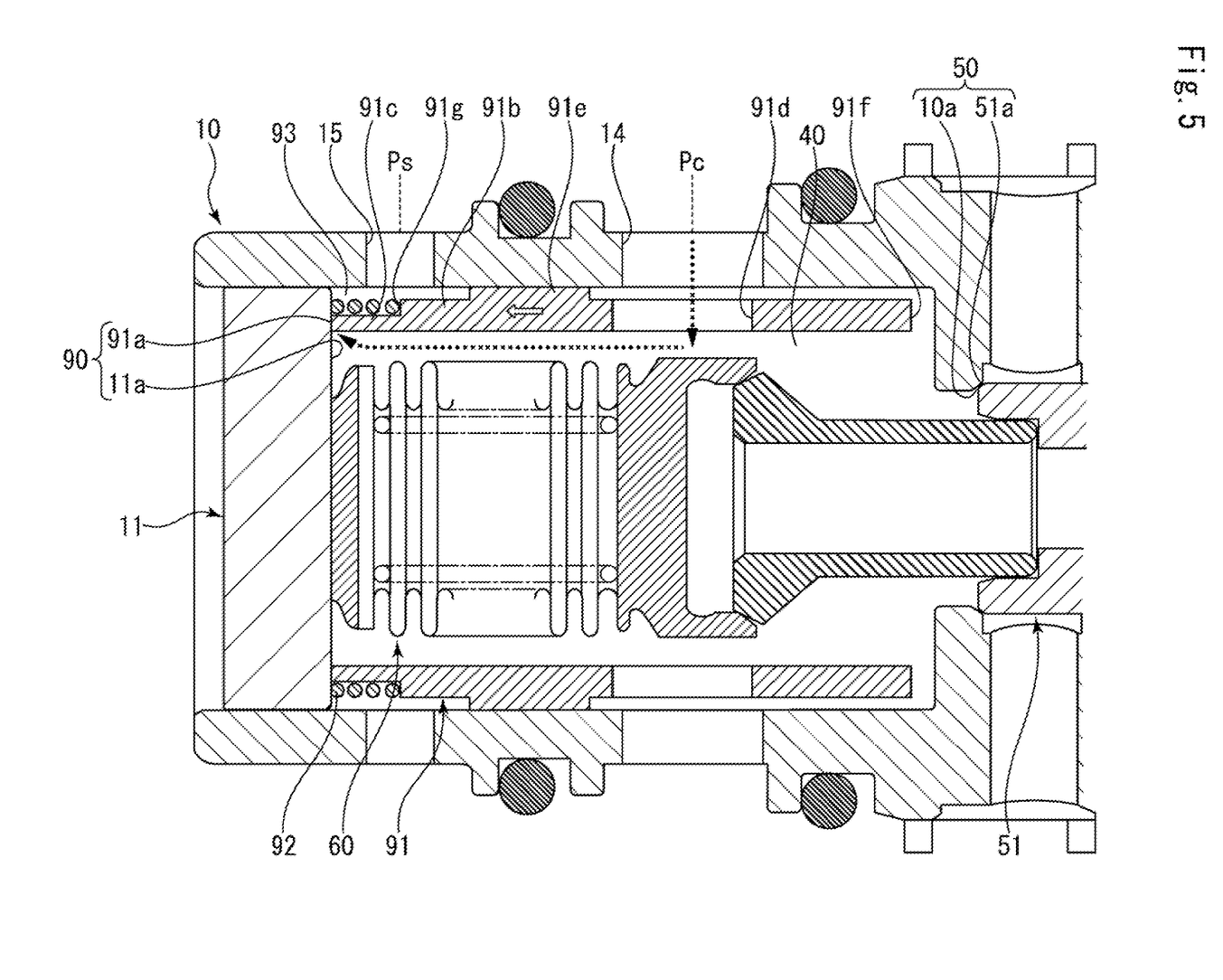
FIG. 5 is an enlarged cross-sectional view illustrating a mode where the differential pressure valve is closed when the capacity control valve of the first embodiment is at a normal control in the energizing state.

As illustrated in FIGS. 3 to 5, the differential pressure valve body 91 has a substantially cylindrical shape, and is concentrically disposed outside the pressure-sensitive body 60 in the radial direction and in the pressure-sensitive chamber 40. In addition, the coil spring 92 is fitted onto an attachment portion 91c having a small diameter which is formed in a left axial end portion of the differential pressure valve body 91. A left axial end of the coil spring 92 is in contact with the right axial end surface of the adjusting partition member 11, and a right axial end of the coil spring 92 is in contact with a side surface 91g of a right axial end of the attachment portion 91c, the side surface 91g extending in the radial direction. Incidentally, an outer periphery of the coil spring 92 is separated from the inner peripheral surface of the valve housing 10 in the radial direction.

Specifically, the differential pressure valve body 91 includes a base portion 91b having a substantially cylindrical shape; the attachment portion 91c having a small diameter which is formed in a left axial end portion of the base portion 91b; a through-hole 91d which is formed in a right axial end portion of the base portion 91b to penetrate therethrough in the radial direction; and an annular protrusion portion 91e which protrudes on a left axial side of the through-hole 91d from an outer peripheral surface of the base portion 91b toward outside in the radial direction. The coil spring 92 fitted onto the attachment portion 91c biases the differential pressure valve body 91 toward right in the axial direction which is a valve opening direction of the differential pressure valve 90. Incidentally, the through-hole 91d has substantially the same opening area as that of the Pc port 14 formed in the valve housing 10, and is disposed at an axial position corresponding to that of the Pc port 14.

In addition, in the differential pressure valve body 91, the differential pressure valve portion 91a which comes into contact with and separates from the differential pressure valve seat 11a formed in the right axial end surface of the adjusting partition member 11 is formed at a left axial end of the attachment portion 91c. Furthermore, an end surface portion 91f which can come into contact with an inner surface of the valve housing 10 (pressure-sensitive chamber 40) when the differential pressure valve 90 is opened is formed on a side of the differential pressure valve 90 which is opposite to the differential pressure valve portion 91a in the axial direction, namely, is formed at a right axial end of the base portion 91b.

In addition, the annular protrusion portion 91e of the differential pressure valve body 91 is formed at a position between the Pc port 14 and the second Ps port 15 in the valve housing 10. An outer peripheral surface of the annular protrusion portion 91e and the inner peripheral surface of the valve housing 10 are slightly separated from each other in the radial direction, so that a very small gap is formed therebetween and the annular protrusion portion 91e can move smoothly in the axial direction.

In addition, since the capacity control valve V has a structure where the pressure-sensitive body 60 and the differential pressure valve 90 are inserted into the pressure-sensitive chamber 40 from a left axial end of the valve housing 10 and then the adjusting partition member 11 is press-fitted and fixed, the assembly of the capacity control valve V is simple.

Subsequently, an opening and closing mechanism of the differential pressure valve 90 will be described. In a state where the control pressures Pc which are applied to the differential pressure valve body 91 from both sides in the axial direction are balanced, since in the differential pressure valve body 91 disposed in the pressure-sensitive chamber 40, pressure-receiving areas for receiving the control pressures Pc which are applied toward right in the axial direction which is the valve opening direction of the differential pressure valve 90 and toward left in the axial direction which is a valve closing direction are substantially the same, the control pressures Pc which are applied to the differential pressure valve body 91 from both sides in the axial direction are balanced and the differential pressure valve body 91 receives the biasing force of the coil spring 92 to move toward right in the axial direction, so that the differential pressure valve 90 is opened (refer to FIGS. 3 and 4).

On the other hand, in a state where the suction pressure Ps of the suction chamber 3 is lower than the control pressure Pc of the control chamber 4, a pressure which is applied to the differential pressure valve body 91 from left in the axial direction is smaller than a pressure which is applied thereto from right in the axial direction, namely, a differential pressure occurs in the axial direction, a force (illustrated with the outlined arrows in FIGS. 3 and 4) to move the differential pressure valve body 91 toward left in the axial direction is applied to the differential pressure valve body 91, and the differential pressure valve body 91 moves toward left in the axial direction against the biasing force of the coil spring 92, so that the differential pressure valve 90 is closed (refer to FIG. 5). Incidentally, the differential pressure valve 90 is not limited to completely closing a gap between the differential pressure valve portion 91a of the differential pressure valve body 91 and the differential pressure valve seat 11a of the adjusting partition member 11. The differential pressure valve 90 may be configured to restrict the flow of the fluid from the Pc port 14 toward the second Ps port 15.

Subsequently, an aspect where a de-energizing state of the capacity control valve V continues will be described. When the capacity control valve V is in the de-energizing state, since the movable core 84 is pressed toward right in the axial direction by the biasing force of the coil spring 85 forming the solenoid 80 or the biasing forces of the coil spring 62 and the bellows core 61, the drive rod 83, the main valve body 51, and the pressure-sensitive valve member 52 move toward right in the axial direction and the second valve portion 51b of the main valve body 51 is seated on the second valve seat 82a of the fixed core 82, so that the second valve 54 is closed, and the first valve portion 51a of the main valve body 51 separates from the first valve seat 10a formed in the inner peripheral surface of the valve housing 10, so that the first valve 50 is opened; however, the illustration is omitted for convenience of description.

As described above, when the capacity control valve V is in the de-energizing state, since the first valve 50 is opened, the fluid in the discharge chamber 2 of the variable displacement compressor M flows into the control chamber 4 from the discharge chamber 2 via the capacity control valve V. The reason is that the discharge pressure Pd is a higher pressure than the control pressure Pc.

Since the discharge pressure Pd flows into the control chamber 4, the control pressure Pc becomes a higher pressure than the control pressure Pc before the de-energizing state and the suction pressure Ps, and the relationship expression, Ps<Pc≤Pd is established. For this reason, the fluid in the control chamber 4 flows into the suction chamber 3 via the foregoing communication passage through which the control chamber 4 and the suction chamber 3 directly communicate with each other and the foregoing fixed orifice. The inflow of the fluid is performed until the discharge pressure Pd, the suction pressure Ps, and the control pressure Pc are balanced. For this reason, when the capacity control valve V is left in the de-energizing state for a long time, the discharge pressure Pd, the suction pressure Ps, and the control pressure Pc become balanced and equalized (Ps=Pc=Pd), and the suction pressure Ps and the control pressure Pc become much higher than the pressures during normal driving. The normal driving is also referred to as continuous driving. In this case, liquefaction occurs in a part of the fluid in the control chamber 4. Incidentally, since the control pressure Pc of the control chamber 4 and the suction pressure Ps of the suction chamber 3 become balanced and equalized, there is no flow of the fluid from the Pc port 14 toward the second Ps port 15 in the pressure-sensitive chamber 40 and the control pressures Pc which are applied to the differential pressure valve body 91, which is disposed in the pressure-sensitive chamber 40, from both sides in the axial direction are balanced. Therefore, the biasing force of the coil spring 92 moves the differential pressure valve body 91 toward right in the axial direction, so that the differential pressure valve 90 is opened. In this case, there is no differential pressure between the control pressure Pc and the suction pressure Ps; however, in this example, the differential pressure between the control pressure Pc and the suction pressure Ps may be in a certain pressure range.

Since the discharge amount of the variable displacement compressor M cannot be appropriately controlled at the control pressure Pc which is much higher than that during normal driving, it is necessary to lower the control pressure Pc by exhausting the liquefied fluid from inside the control chamber 4.

Subsequently, an aspect where when the variable displacement compressor M starts up, the liquefied fluid is exhausted from inside the control chamber 4 will be described.

When the variable displacement compressor M starts up in a state where the discharge pressure Pd, the suction pressure Ps, and the control pressure Pc are equalized, since the control pressure Pc at that time is much higher than the control pressure Pc during normal driving, the swash plate 6 enters the state of being substantially perpendicular to the rotary shaft 5, and the stroke amounts of the pistons 7 are minimized. In addition, the variable displacement compressor M starts energizing the capacity control valve V in accordance with the own startup.

In the capacity control valve V, when the coil 86 of the solenoid 80 is energized from the de-energizing state (i.e., a state where the first valve 50 is open) which is not illustrated, the coil 86 is excited to generate a magnetic force, the movable core 84 is attracted toward the fixed core 82 receiving the magnetic force, the drive rod 83 of which the right axial end portion is coupled to the movable core 84 is driven, and the main valve body 51 coupled to the left axial end portion of the drive rod 83 moves toward left in the axial direction (refer to FIG. 2). In this case, the main valve body 51 and the pressure-sensitive valve member 52 move integrally toward left in the axial direction.

Accordingly, in the capacity control valve V, as illustrated in FIG. 2, the first valve portion 51a of the main valve body 51 is seated on the first valve seat 10a formed in the inner peripheral surface of the valve housing 10, so that the first valve 50 is closed. In this case, the second valve portion 51b of the main valve body 51 separates from the second valve seat 82a formed in the opening end surface of the fixed core 82, so that the second valve 54 is opened. Incidentally, since the pressure-sensitive body 60 contracts due to the suction pressure Ps which is much higher than that during normal driving, the right axial end 70a of the adapter 70 separates from the pressure-sensitive valve seat 52a of the pressure-sensitive valve member 52, so that the pressure-sensitive valve 53 is opened.

In addition, when the variable displacement compressor M starts up, since the suction pressure Ps of the suction chamber 3 is slightly lowered by the strokes of the pistons 7, due to a pressure difference between the control pressure Pc of the control chamber 4 and the suction pressure Ps of the suction chamber 3, the flow of the fluid from the Pc port 14 toward the first Ps port 13 via the pressure-sensitive valve 53 and through the intermediate communication passage 55 (refer to FIG. 2), and the flow of the fluid from the Pc port 14 toward the second Ps port 15 via the differential pressure valve 90 occur in the pressure-sensitive chamber 40.

Accordingly, when the variable displacement compressor M starts up, in the capacity control valve V of this example, since the pressure-sensitive valve 53 and the differential pressure valve 90 are opened, so that two flow paths (i.e., the intermediate communication passage 55 as a first communication passage and a differential pressure communication passage as a second communication passage illustrated with the solid line arrows in FIG. 3) through which the Pc port 14 communicates with the first Ps port 13 and the second Ps port 15 are opened, it is possible to sufficiently secure a flow path cross-sectional area for exhausting the liquefied refrigerant of the control chamber 4; and thereby, it is possible to improve the startup responsiveness by exhausting the liquefied fluid from inside the control chamber 4 through the pressure-sensitive valve 53 and the differential pressure valve 90 within a short time.

In addition, after the variable displacement compressor M starts up, both of the control pressure Pc of the control chamber 4 and the suction pressure Ps of the suction chamber 3 are lowered, and the liquefied fluid is exhausted from the control chamber 4.

Furthermore, when the control chamber 4 is in a maximum displacement state, in the capacity control valve V of this example, the pressure-sensitive body 60 extends due to the suction pressure Ps being lowered, to cause the right axial end 70a of the adapter 70 to be seated on the pressure-sensitive valve seat 52a of the pressure-sensitive valve member 52, and even when the suction pressure Ps is low and the pressure-sensitive valve 53 is not opened, the differential pressure valve 90 is opened, so that the differential pressure communication passage (illustrated with the solid line arrows in FIG. 4) through which the Pc port 14 communicates with the second Ps port 15 is opened; and thereby, it is possible to maintain that the control pressure Pc and the suction pressure Ps are equalized (i.e., the same pressure). For this reason, it is possible to improve the operational efficiency by stabilizing the strokes of the pistons 7 in the cylinders 4a of the control chamber 4 and maintaining the maximum displacement state. Here, both of the differential pressure valve 90 and the pressure-sensitive valve 53 are opened by the differential pressure between the control pressure Pc and the suction pressure Ps, and the differential pressure valve 90 is set to operate at a smaller differential pressure than the pressure-sensitive valve 53.

In addition, in the normal control of the capacity control valve V, since the balanced state of the control pressures Pc which are applied to the differential pressure valve body 91 from both sides in the axial direction collapses and the control pressures Pc moves the differential pressure valve body 91 toward left in the axial direction against the biasing force of the coil spring 92, so that the differential pressure valve 90 is closed (illustrated with the dotted line arrows in FIG. 5), it is possible to prevent the leakage of the fluid from the Pc port 14 toward the second Ps port 15; and thereby, it is possible to improve the control accuracy of the control pressure Pc by the capacity control valve V.

In addition, as illustrated in FIG. 5, in the normal control where the first valve 50 and the differential pressure valve 90 are closed, the control pressure Pc in the pressure-sensitive chamber 40 becomes high, and the suction pressure Ps from the second Ps port 15 is supplied to a space 93 that is defined by the right axial end surface of the adjusting partition member 11, the inner peripheral surface of the valve housing 10, and an outer peripheral surface of the differential pressure valve body 91 which is positioned closer to the left side in the axial direction than the annular protrusion portion 91e. Accordingly, there occurs a differential pressure between the control pressure Pc applied to a pressure-receiving surface of the differential pressure valve body 91 which is positioned closer to the right side in the axial direction than the annular protrusion portion 91e and the suction pressure Ps applied to a pressure-receiving surface of the differential pressure valve body 91 which is positioned closer to the left side in the axial direction than the annular protrusion portion 91e, and a force (illustrated with the outlined arrow in FIG. 5) involved by the control pressure Pc to move the differential pressure valve body 91 toward left in the axial direction against the biasing force of the coil spring 92 is applied; and thereby, in the normal control, the state where the differential pressure valve 90 is closed is easily maintained.

In addition, since the differential pressure valve 90 includes the differential pressure valve body 91 having a substantially cylindrical shape and the coil spring 92 that biases the differential pressure valve body 91 in the valve opening direction of the differential pressure valve 90, and the differential pressure valve 90 is concentrically provided outside the pressure-sensitive valve 53 (pressure-sensitive body 60) in the radial direction, the capacity control valve V including the differential pressure valve 90 can be made compact.

In addition, when the differential pressure valve body 91 is biased in the valve opening direction of the differential pressure valve 90, since the end surface portion 91f which is opposite to the differential pressure valve portion 91a in the axial direction comes into contact with the inner surface of the valve housing 10 (in the pressure-sensitive chamber 40), the maximum opening area of the differential pressure valve 90 can be set by contact between the end surface portion 91f of the differential pressure valve body 91 and the inner surface of the valve housing 10; and thereby, it is possible to simplify the structure of the differential pressure valve 90.

In addition, since the outer peripheral surface of the annular protrusion portion 91e of the differential pressure valve body 91 is guided by the inner peripheral surface of the valve housing 10, it is possible to stably perform the opening and closing operation of the differential pressure valve 90; and thereby, it is possible to simplify the structure of the differential pressure valve 90.

In addition, separately from the first Ps port 13 that is allowed to communicate with the suction chamber 3 via the intermediate communication passage 55 by the opening and closing of the pressure-sensitive valve 53, the valve housing 10 is provided with the second Ps port 15 that forms the differential pressure communication passage (illustrated with the solid line arrows in FIGS. 3 and 4) which is opened and closed by the differential pressure valve 90, and that communicates with the suction chamber 3; and thereby, it is possible to simplify the structure of the valve housing 10.

Second Embodiment

Figure 6:
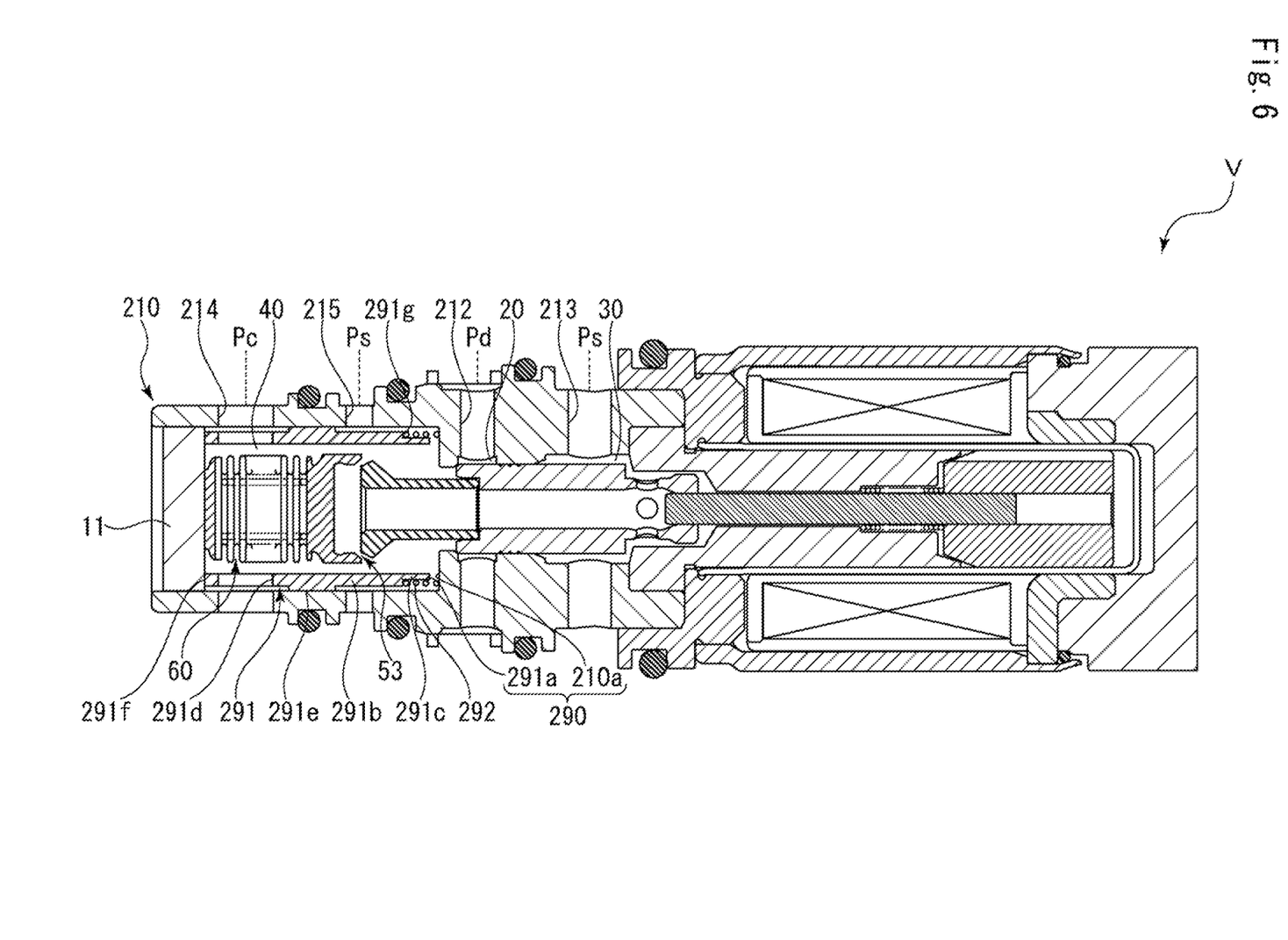
FIG. 6 is a cross-sectional view illustrating a mode where a first valve is closed and a pressure-sensitive valve and a differential pressure valve are opened when a capacity control valve according to a second embodiment of the present invention is at startup in an energizing state.

Subsequently, a capacity control valve according to a second example will be described with reference to FIG. 6.

Incidentally, the same reference signs are assigned to the same components as the components described in the foregoing example, and repeated descriptions will be omitted.

The capacity control valve V in the second example will be described. As illustrated in FIG. 6, a Pd port 212 through which the first valve chamber 20 communicates with the discharge chamber 2 of the variable displacement compressor M, a first Ps port 213 that is a Ps port through which the second valve chamber 30 communicates with the suction chamber 3 of the variable displacement compressor M, a Pc port 214 through which the pressure-sensitive chamber 40 communicates with the control chamber 4 of the variable displacement compressor M, and a second Ps port 215 that is another Ps port which is adjacent to a right axial side of the Pc port 214 and through which the pressure-sensitive chamber 40 communicates with the suction chamber 3 of the variable displacement compressor M are formed in a valve housing 210.

A differential pressure valve body 291 has a substantially cylindrical shape, and is concentrically disposed outside the pressure-sensitive body 60 in the radial direction and in the pressure-sensitive chamber 40. In addition, a coil spring 292 which is a spring is fitted onto an attachment portion 291c having a small diameter which is formed in a right axial end portion of the differential pressure valve body 291. A right axial end of the coil spring 292 is in contact with an inner surface of the valve housing 210, and a left axial end of the coil spring 292 is in contact with a side surface 291g of a right axial end of the attachment portion 291c, the side surface 291g extending in the radial direction.

Specifically, the differential pressure valve body 291 includes a base portion 291b having a substantially cylindrical shape; the attachment portion 291c having a small diameter which is formed in a right axial end portion of the base portion 291b; a through-hole 291d which is formed in a left axial end portion of the base portion 291b to penetrate therethrough in the radial direction; and an annular protrusion portion 291e which protrudes on a right axial side of the through-hole 291d from an outer peripheral surface of the base portion 291b toward outside in the radial direction. The coil spring 292 fitted onto the attachment portion 291c biases the differential pressure valve body 291 toward left in the axial direction which is a valve opening direction of a differential pressure valve 290. Incidentally, the through-hole 291d has substantially the same opening area as that of the Pc port 214 formed in the valve housing 210, and is disposed at axial position corresponding to that of the Pc port 214.

In addition, in the differential pressure valve body 291, a differential pressure valve portion 291a which comes into contact with and separates from a differential pressure valve seat 210a formed in an inner surface of the valve housing 210 is formed at the right axial end of the attachment portion 291c. Furthermore, an end surface portion 291f which can come into contact with the right axial end surface of the adjusting partition member 11 when the differential pressure valve 290 is opened is formed on a side of the differential pressure valve 290 which is opposite to the differential pressure valve portion 291a in the axial direction, namely, is formed at a left axial end of the base portion 291b.

Subsequently, an opening and closing mechanism of the differential pressure valve 290 will be described. In a state where the control pressures Pc which are applied to the differential pressure valve body 291 from both sides in the axial direction are balanced, since in the differential pressure valve body 291 disposed in the pressure-sensitive chamber 40, pressure-receiving areas for receiving the control pressures Pc which are applied toward left in the axial direction which is the valve opening direction of the differential pressure valve 290 and toward right in the axial direction which is a valve closing direction are substantially the same, the control pressures Pc which are applied to the differential pressure valve body 291 from both sides in the axial direction are balanced and the differential pressure valve body 291 receives the biasing force of the coil spring 292 to move toward left in the axial direction, so that the differential pressure valve 290 is opened (refer to FIG. 6).

On the other hand, in a state where the suction pressure Ps of the suction chamber 3 is lower than the control pressure Pc of the control chamber 4, a pressure which is applied to the differential pressure valve body 291 from right in the axial direction is smaller than a pressure which is applied thereto from left in the axial direction, namely, a differential pressure occurs in the axial direction, a force to move the differential pressure valve body 291 toward right in the axial direction is applied to the differential pressure valve body 291, and the differential pressure valve body 291 moves toward right in the axial direction against the biasing force of the coil spring 292, so that the differential pressure valve 290 is closed (not illustrated).

Accordingly, when the variable displacement compressor M starts up, in the capacity control valve V of this example, since the pressure-sensitive valve 53 and the differential pressure valve 290 are opened, so that a flow path through which the Pc port 214 communicates with the first Ps port 213 and the second Ps port 215 is opened, it is possible to sufficiently secure a flow path cross-sectional area for exhausting a liquefied refrigerant of the control chamber 4; and thereby, it is possible to improve the startup responsiveness by exhausting the liquefied fluid from inside the control chamber 4 through the pressure-sensitive valve 53 and the differential pressure valve 290 within a short time.

Furthermore, when the control chamber 4 is in a maximum displacement state, in the capacity control valve V of this example, even in a case where the suction pressure Ps is low and the pressure-sensitive body 60 extends to close the pressure-sensitive valve 53, it is possible to maintain that the control pressure Pc and the suction pressure Ps are equalized (i.e., the same pressure) by opening the differential pressure valve 290 which results in opening a flow path (not illustrated) through which the Pc port 214 communicates with the second Ps port 215; and thereby, it is possible to improve the operational efficiency by stabilizing the strokes of the pistons 7 in the cylinders 4a of the control chamber 4 and maintaining the maximum displacement state.

The examples of the present invention have been described above with reference to the drawings; however, a specific configuration is not limited to the examples, and the present invention also includes changes or additions which are made without departing from the concept of the present invention.

For example, in the foregoing examples, the differential pressure valve is configured such that the differential pressure occurs due to the flow of the fluid from the Pc port toward the second Ps port based on the pressure difference between the control pressure Pc and the suction pressure Ps, to operate the differential pressure valve body in the valve closing direction of the differential pressure valve; however, the present invention is not limited to the configuration. For example, the differential pressure valve may be configured such that the control pressure Pc is applied from one side of the differential pressure valve body in the axial direction and the suction pressure Ps is applied from the other side of the differential pressure valve body in the axial direction, and the differential pressure valve body is moved in the opening and closing direction using the differential pressure between the control pressure Pc and the suction pressure Ps, to open and close the flow of the fluid from the Pc port toward the second Ps port.

In addition, the differential pressure valve is not limited to being provided inside the capacity control valve V; however, the differential pressure valve may be provided outside the capacity control valve V to open and close the communication passage through which the control chamber 4 and the suction chamber 3 of the variable displacement compressor M communicate with each other.

In addition, the communication passage through which the control chamber 4 and the suction chamber 3 of the variable displacement compressor M communicate with each other, and the fixed orifice may not be provided.

In addition, in the foregoing examples, the second valve may not be provided, and the second valve portion of the main valve body may serve as a support member receiving an axial load, and a sealing function is not necessarily required.

In addition, the differential pressure valve and the Pc port may be provided in the second valve chamber.

In addition, the second valve chamber 30 may be provided opposite to the solenoid 80 in the axial direction, and the pressure-sensitive chamber 40 may be provided on a solenoid 80 side.

In addition, an aspect where when the variable displacement compressor M is left for a long time, the discharge pressure Pd, the suction pressure Ps, and the control pressure Pc are equalized has been described; however, the present invention is not limited thereto, and only the suction pressure Ps may be slightly low all the time.

In addition, the coil spring 92 is not limited to a compression spring, and may be a tensile spring and have a shape other than a coil shape.

In addition, the pressure-sensitive body 60 may be one in which a coil spring is not used.

REFERENCE SIGNS LIST

1 Casing
2 Discharge chamber
3 Suction chamber
4 Control chamber
10 Valve housing
10a First valve seat (main valve seat)
11 Adjusting partition member
11a Differential pressure valve seat
12 Pd port
13 First Ps port (Part of Ps port)
14 Pc port
15 Second Ps port (Part of Ps port)
20 First valve chamber
30 Second valve chamber
40 Pressure-sensitive chamber
50 First valve (main valve)
51 Main valve body
51a First valve portion (main valve portion)
51b Second valve portion
52 Pressure-sensitive valve member
52a Pressure-sensitive valve seat
53 Pressure-sensitive valve
54 Second valve
55 Intermediate communication passage
60 Pressure-sensitive body
61 Bellows core 62 Coil spring
70 Adapter
70a Right axial end
80 Solenoid
82 Fixed core
82a Second valve seat
90 Differential pressure valve
91 Differential pressure valve body
91a Differential pressure valve portion
91b Base portion
91c Attachment portion
91d Through-hole
91e Annular protrusion portion
91f End surface portion
91g Side surface
92 Coil spring (spring)
93 Space
210 Valve housing
210a Differential pressure valve seat
212 Pd port
213 First Ps port (Ps port different from the Ps port)
214 Pc port
215 Second Ps port (Part of Ps port)
290 Differential pressure valve
291 Differential pressure valve body
291a Differential pressure valve portion
291b Base portion
291c Attachment portion
291d Through-hole
291e Annular protrusion portion
291f End surface portion
292 Coil spring (spring)
Pc Control pressure
Pd Discharge pressure
Ps Suction pressure
V Capacity control valve

The invention claimed is:

1. A capacity control valve comprising:
a valve housing provided with a Pc port, a Pd port, a first Ps port and a second Ps port;
a main valve body that includes a main valve portion which is configured to come into contact with and to separate from a main valve seat to close and open a communication between the Pd port and the Pc port using a driving force of a solenoid;
a pressure-sensitive valve that is configured to open and close, depending on a surrounding pressure, a first communication passage through which the Pc port and the first Ps port are communicable with each other; and
a differential pressure valve that is configured to open and close, depending on a pressure difference, a second communication passage through which the Pc port and the second Ps port are communicable with each other.

2. The capacity control valve according to claim 1, wherein a maximum opening area of the differential pressure valve is smaller than a flow path cross-sectional area of the Pc port.

3. The capacity control valve according to claim 1, wherein the differential pressure valve includes a differential pressure valve body having a cylindrical shape and a spring which is configured to bias the differential pressure valve body in a valve opening direction, and is concentrically provided outside the pressure-sensitive valve in a radial direction.

4. The capacity control valve according to claim 3, wherein the differential pressure valve body includes a differential pressure valve portion that is configured to seat on a differential pressure valve seat, and when the differential pressure valve body is biased and moved in the valve opening direction of the differential pressure valve, an end portion of the differential pressure valve body which is remote from the differential pressure valve portion in an axial direction comes into contact with an inner surface of the valve housing.

5. The capacity control valve according to claim 2, wherein the differential pressure valve includes a differential pressure valve body having a cylindrical shape and a spring which is configured to bias the differential pressure valve body in a valve opening direction, and is concentrically provided outside the pressure-sensitive valve in a radial direction.

6. The capacity control valve according to claim 5, wherein the differential pressure valve body includes a differential pressure valve portion that is configured to seat on a differential pressure valve seat, and when the differential pressure valve body is biased and moved in the valve opening direction of the differential pressure valve, an end portion of the differential pressure valve body which is remote from the differential pressure valve portion in an axial direction comes into contact with an inner surface of the valve housing.

* * * * *